June 20, 1972　　M. D. THOMAS ET AL　　3,671,114
ECCENTRIC DRIVE FILM ADVANCING SYSTEM
Filed April 28, 1970　　3 Sheets-Sheet 1
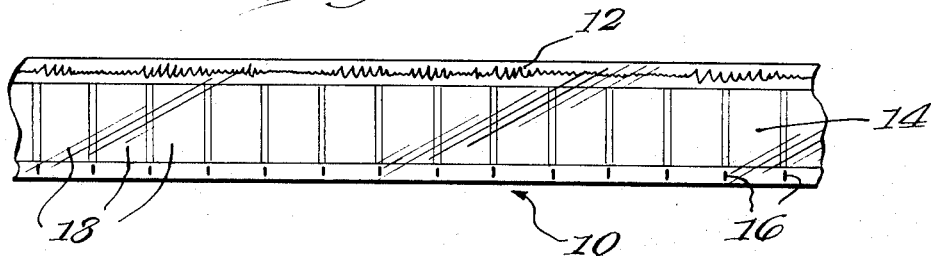
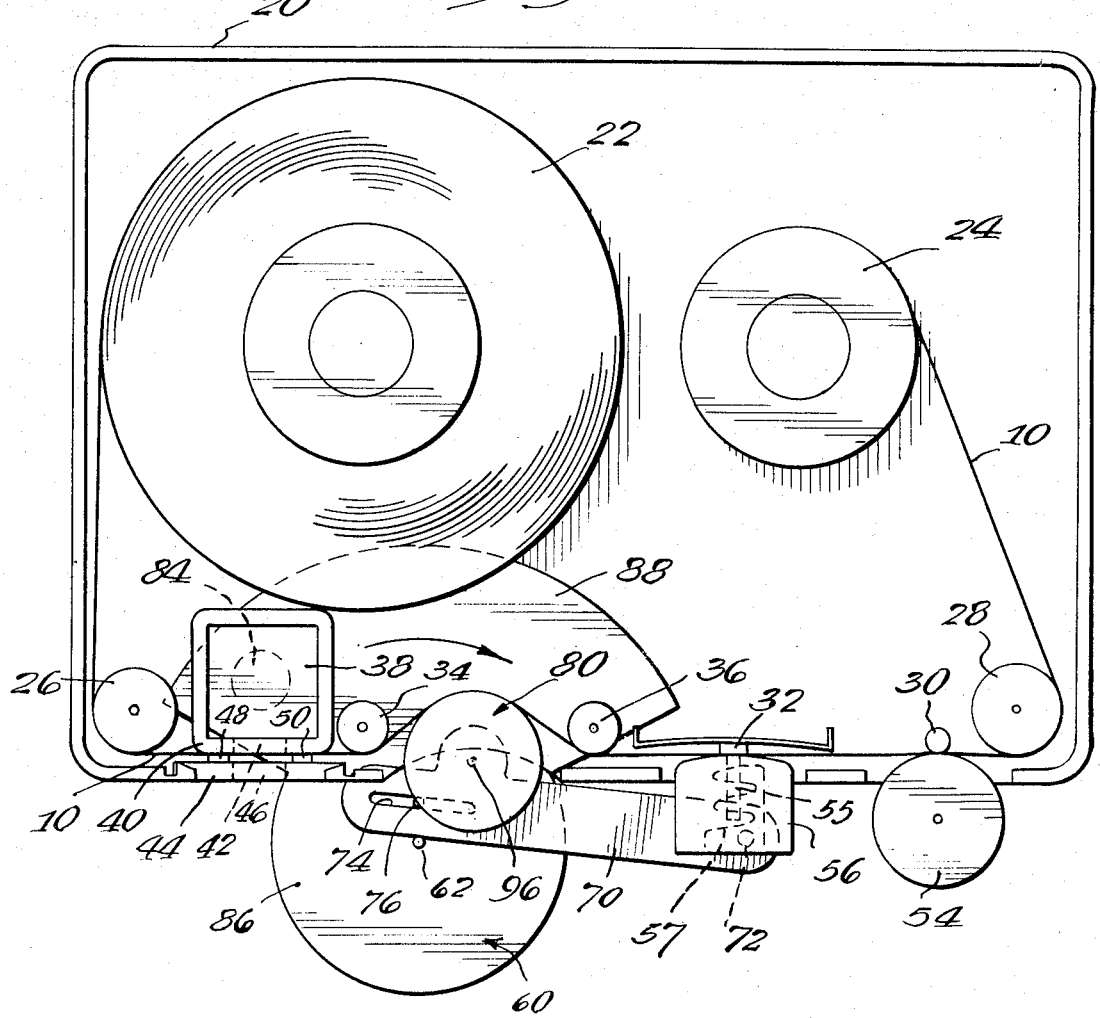
INVENTORS
Michael D. Thomas
Sidney Milovac
BY Dressler, Goldsmith, Clement & Gordon
ATTORNEYS

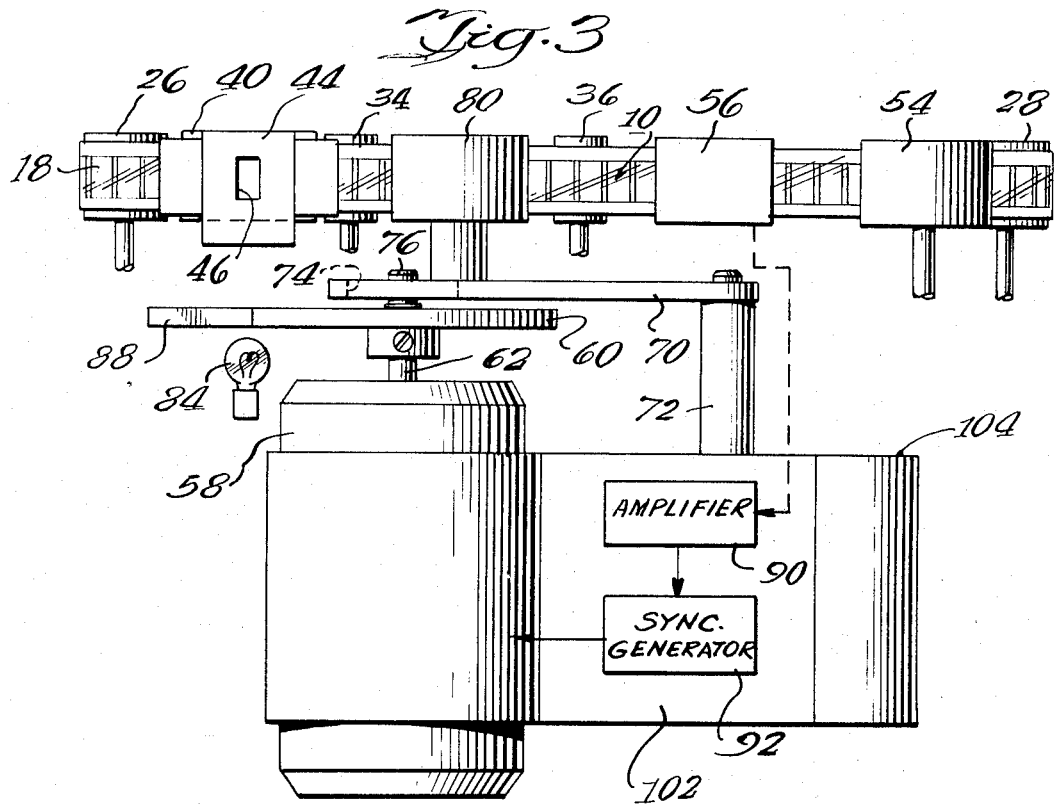
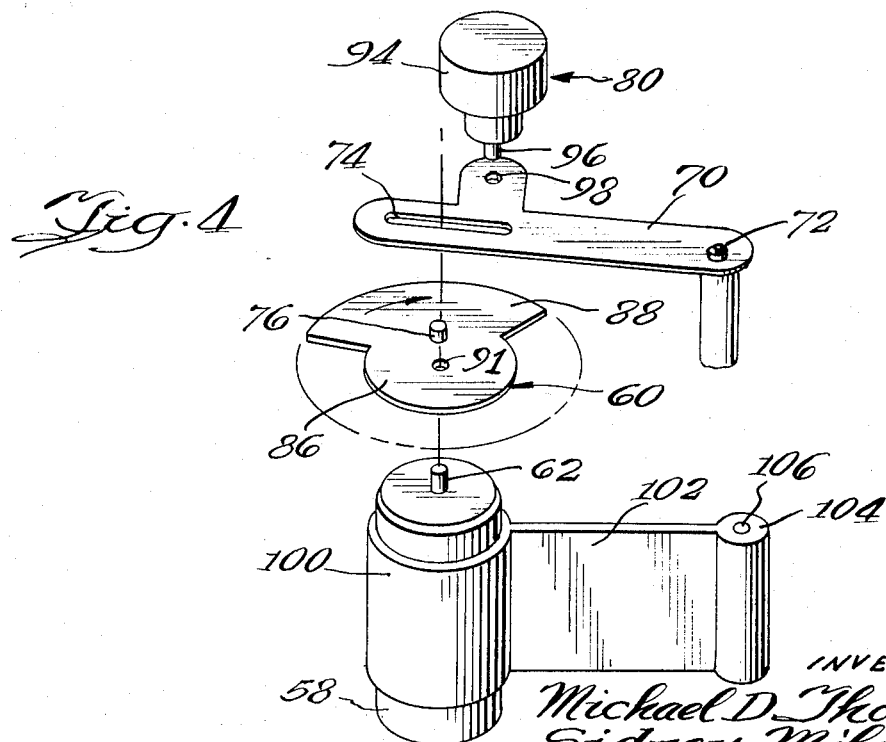

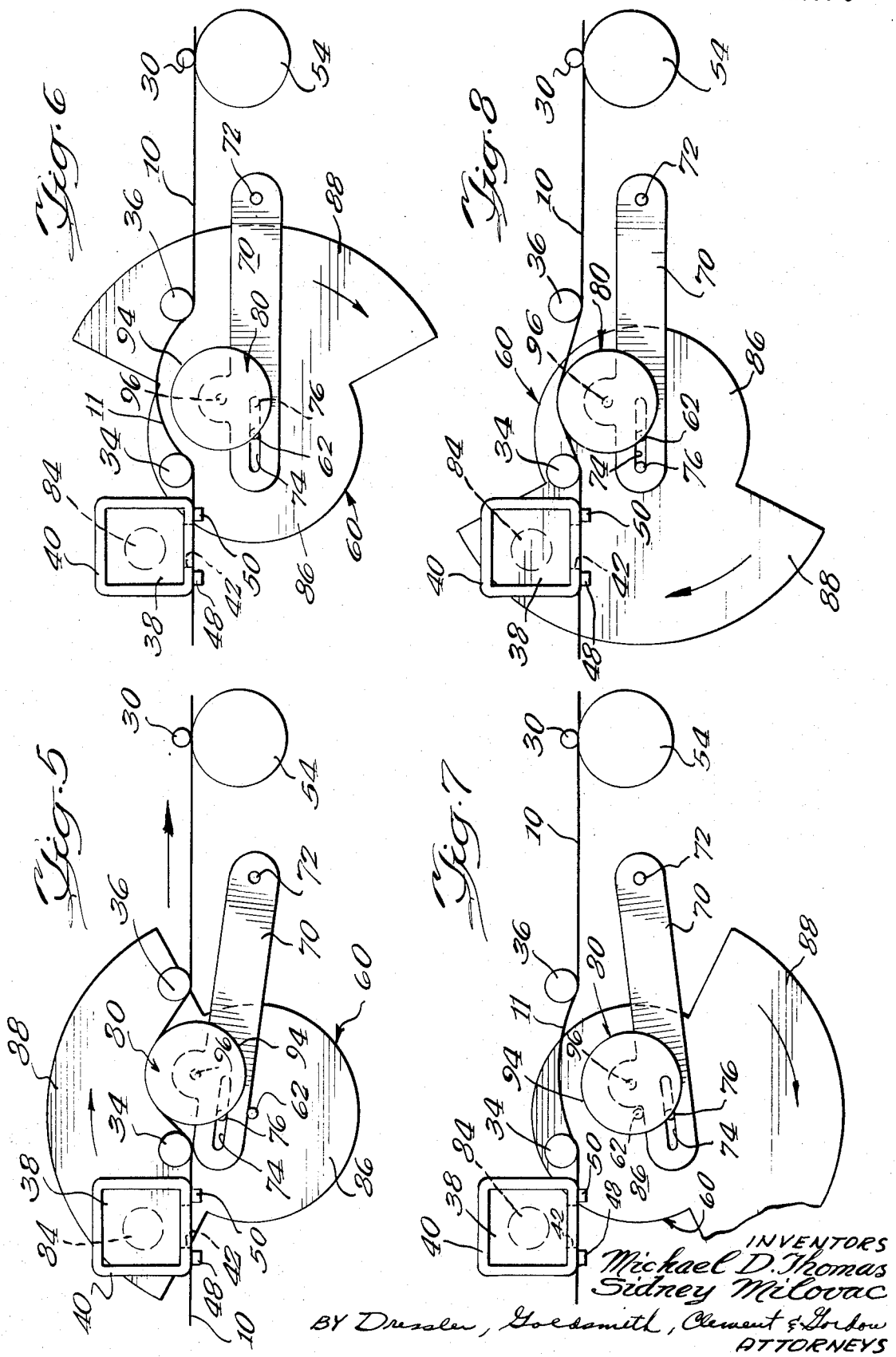

3,671,114
ECCENTRIC DRIVE FILM ADVANCING SYSTEM
Michael D. Thomas, 640 Fern Court, Elmhurst, Ill.
60126, and Sidney Milovac, 10521 S. Kostner, Oak
Lawn, Ill. 60453
Filed Apr. 28, 1970, Ser. No. 32,649
Int. Cl. G03b 1/34
U.S. Cl. 352—185
23 Claims

ABSTRACT OF THE DISCLOSURE

A film advancing system for use with non-apertured continuous film (such as motion picture film) that carries successive areas for pictures, together with sequencing signals coordinated with the successive areas. While the forward portions of the film near the exit end of the film advancing path are driven at a constant speed, the following portions of the film are advanced intermittently by a member that periodically applies a lateral force against an intermediate portion of the film to pull a length of the film past an aperture plate. The intermittent film advancing mechanism is driven in response to the sequencing signals carried by the constantly advancing film, which signals are picked up by a magnetic head, and a light stopping means (such as a shutter member) cooperates with the intermittent film advancing mechanism to stop the light from radiating along its normal path to the film while the film is being advanced past the aperture plate, and to allow light to impinge on the film when the film is stationary adjacent the aperture plate.

FIELD OF THE INVENTION

This invention relates to a film advancing system, and more particularly, to a system for advancing continuous film (for example, motion picture film) that does not have apertures (more commonly known as "sprocket holes") for cooperation with projector or camera sprockets.

Although the system specifically described herein relates to motion picture projection, it is to be understood that it is equally applicable to a motion picture camera, which focuses illuminated images on a light sensitive film instead of illuminating a developed film and projecting the images it carries onto a screen, as in motion picture projection. It is also applicable to a projector or camera in which any continuous film carrying successive picture frames (not necessarily a motion picture film) is employed.

BACKGROUND OF THE INVENTION

Conventional motion picture film has a continuous series of apertures or sprocket holes adjacent at least one edge of the film, for cooperation with intermittently moving sprockets in a motion picture camera or projector. These apertures and the corresponding sprockets are useful in order to allow the film to move steadily and continuously at the take-up reel, while allowing the film to move intermittently past the aperture plate of the projector or camera in synchronism with the shutter. In other words, the sprocket holes and cooperating sprockets make certain that one picture frame will be positioned adjacent the aperture plate at the time the shutter is allowing light to pass through the aperture of the aperture plate and against the film, and the film will be advanced during the time the shutter is blocking the light.

In the case of 35 mm. motion picture film, the apertures are located adjacent both edges of the film. In 16 mm. film, the apertures are sometimes along a single edge of the film and other times on both edges thereof. With 8 mm. and Super 8 film, the film has apertures along a single edge of the film.

These apertures consume a relatively large portion of the film and tend to weaken the film, thereby making it easier for the film to tear than if the apertures were not present. Further, on occasion the film between adjacent apertures will tear, thereby connecting adjacent apertures in a manner that will prevent the motion picture film from being advanced properly when the film is being exposed or projected.

These disadvantages are overcome by the system of the present invention which is used with non-apertured film that carries successive picture frames (whether developed pictures or areas to be exposed) and accompanying sequencing signals. In the illustrative embodiment of the present invention, the film advancing system of this invention is used with a motion picture projector, and the film to be projected contains a first band comprising recorded sound, a second band comprising the picture frames and a third band comprising magnetic pulses which are used as sequencing signals.

BRIEF SUMMARY OF THE INVENTION

The present invention constitutes a motion picture film advancing system for use with non-apertured film that carries successive picture areas or frames and accompanying sequencing signals. The system includes means for holding a rotatable feed reel on which the film is wound for use, means for holding a rotatable take-up reel on which the film is wound after use, and means for rotating the take-up reel. The film is moved along a film advancing path which has an aperture plate adjacent thereto at its entry end. This plate defines an aperture that is substantially the size of each picture frame on the film.

Drive means advance forward portions of the film at a constant speed toward the exit end of the film advancing path. Means are provided for restricting movement of succeeding portions of the film along the film advancing path with respect to the aperture plate.

A diverting means periodically applies a lateral force against the film at an intermediate location between the aperture plate and the drive means to cause a length of the film to be intermittently advanced past the aperture plate by diverting an intermediate portion of the film sidewise from the film advancing path, while the portions sidewise from the film advancing path, while the portions of the film forward of the diverting means continue to move toward the exit end of the film advancing path at a constant linear speed. This pulls the length of film referred to past the movement restricting means. A pickup means receives sequencing signals from the film as it moves along the film advancing path toward the take-up reel, and means are provided coupling the pickup means to the diverting means just mentioned, so that the lateral force of the diverting means will be applied to the film in response to the sequencing signals.

Means are provided to define a light path through the aperture plate to the film to be projected or exposed. A means (such as a shutter), cooperatively actuated with the film diverting means, stops light from radiating along said path through the aperture plate whenever a lateral force is applied against the film by the diverting means.

In the illustrative embodiment, the sequencing signals are magnetic pulses and the pickup means comprises an electromagnetic head having a magnetic core surrounded by a coil, with the head being positioned for contact with the film. Means are coupled to the head for amplifying the pulses induced in the coil and means are provided for generating a signal responsive to the amplified pulses to operate the diverting means in response to the sequencing signals.

The illustrative embodiment of this invention includes a motor having a shaft to which shutter means is connected, and to which cam means is also connected to provide reciprocating motion of the diverting means during movement of the shutter means into and out of position to block light radiating from the light source through the film. This reciprocating motion applies lateral force against the film to cause a length of film to be advanced past the aperture plate during the time the shutter is blocking the light path.

A more detailed explanation of the invention is provided in the following description and claims, and is illustrated in the accompanying drawings.

BRIEF DESCRIPTION OF THE DRAWINGS

FIG. 1 is a fragmentary view of a type of motion picture film utilizable with the advancing mechanism of the present invention.

FIG. 2 is a top plan view of the film advancing system of this invention.

FIG. 3 is a front elevational view of the film advancing system of FIG. 2.

FIG. 4 is an exploded view of a diverting means and shutter means that are cooperatively actuated in the film advancing system of the present invention.

FIG. 5 is a schematic view of the diverting means and shutter means illustrated in FIG. 2, in a first position.

FIG. 6 is a schematic view of the diverting means and shutter means illustrated in FIG. 2, in a second position.

FIG. 7 is a schematic view of the diverting means and shutter means illustrated in FIG. 2, in a third position.

FIG. 8 is a schematic view of the diverting means and shutter means illustrated in FIG. 2, in a fourth position.

DETAILED DESCRIPTION

FIG. 1 show sa portion of motion picture film utilizable with the film advancing system of the present invention. The film comprises a strip 10 having a band 12 containing sound signals, a band 14 comprising successive picture frames and a band 16 carrying coordinated sequencing signals.

In a preferred embodiment, strip 10 is formed by Mylar thermoplastic material, which material is the biaxially oriented film of the condensation polymer of ethylene glycol and terephthalic acid, produced by E. I. du Pont de Nemours & Co., Inc. Bands 12 and 16 are iron oxide coatings on the Mylar film, which coatings have been magnetized with sound signals and sequencing signals, respectively. The sound signals may be either monaural or stereophonic, as desired. Band 14 is clear Mylar film which has been sensitized with a photographic emulsion, exposed to light and processed to provide a series of picture frames 18.

As the film used with the film advancing system of this invention does not have apertures, it may be considerably thinner than the conventional motion picture film that is perforated on one or both edges with apertures or sprocket holes. This makes it possible to use films that are of much greater length, because when wound on a feed reel or take-up reel the thinness of the film keep the volume occupied by the wound film down to a minimum.

A system for advancing the film of FIG. 1 is illustrated in FIGS. 2 and 3. This system comprises a removable cartridge or cassette 20 that contains feed reel 22, take-up reel 24, idling support rollers 26 and 28, rotating capstan 30, pressure pad 32, rollers 34 and 36, mirror 38, and aperture plate 40 defining frame aperture 42.

Rollers 26, 34, 36 and 28 define a film advancing path along which the film is moved as it travels from feed reel 22 to take-up reel 24. The forward portions of film 10 are moved at a constant speed toward the exit end of the film advancing path by the rotation of capstan 30.

Removable cartridge 20, containing the elements just listed, as positioned within the case of a projection machine which includes a pressure member 44 defining aperture 46 and having felt pressure pads 48 and 50, a freely rotating pressure roller 54, a magnetic pickup head 56, and intermittent film advancing means including a synchronous motor 58 having a shutter member 60 keyed to its shaft 62 and a drive arm 70 having a fixed pivot point 72 at one end thereof and a slot 74 at the other end thereof. The slot of drive arm 70 receives an eccentric pin 76 which is connected to shutter member 60 and which causes reciprocating movement of diverting member 80 during rotation of shaft 62.

The projection machine contains a lamp 84 which provides a light beam that is reflected from 45° mirror 38 through aperture 42 of aperture plate 40, through film 10 and through aperture 46 of pressure member 44.

Shutter member 60 comprises a wheel portion 86 carrying radial extension 88 on a portion of its periphery. Extension 88 is of a size to be interposed between lamp 84 and mirror 38 and thereby block the light path at a predetermined time, as will be discussed in more detail below.

Pickup head 56 is a conventional magnetic pickup head which comprises a pair of magnetic cores 55 having coils 57 wound thereon. The first core engages the sound track 12 on film 10, with pressure pad 32 pressing against the other side of the film. The coil is coupled through a conventional amplifying system to a loudspeaker for the sound that accompanies the showing of the film. The lower core of head 56 engages band 16 and picks up the magnetized sequencing signals. The signals, which induce a current in the coil surrounding the core, are amplified via a conventional amplifier 90 and are fed to a conventional synchronous generator 92. Synchronous generator 92 drives motor 58 at a speed that is proportional to the frequency of the sequencing signals so that the film will move intermittently past the aperture plate and on through the projector at a predetermined and appropriate rate.

Changing the diameter of capstan 30 will alter the linear speed of the forward portions of film 10, which in turn will change the speed of rotation of motor 58. This will cause the number of frames that move past aperture plate 40 in any given period of time to change. If desired, the rotating member that drives the forward portions of film 10 may be positioned outside cartridge 20 and engage the film through an aperture in the cartridge wall.

In the illustrative embodiment, the shutter member 60 is dimensioned to allow light to pass about 65 percent of the operating time. In conventional motion picture projection, light passes through the film only about 20 percent of the operating time. It can be seen that the present invention makes possible the consumption of a relatively small amount of light energy, thereby rendering the system effective for battery power operation.

The constructional details of the shutter mechanism and the intermittent film advancing mechanism are seen most clearly in FIG. 4. Shutter member 60 which carries eccentic pin 76 is keyed to shaft 62 of motor 58 via aperture 91. Eccentric pin 76 rides in slot 74 of drive arm 70, and diverting member 80 has a generally cylindrical portion 94 which contacts the film and carries a pin 96 which is rotatable within aperture 98 in arm 70.

Motor 58 is frictionally connected to a bracket 100 having a pivot arm 102 with a sleeve 104 at the opposite end. Sleeve 104 has an aperture 106 through which a bolt and wing nut (not shown) connects arm 102 to a fixed point. When the wing nut is loosened, motor 58 is pivotable about the axis of aperture 106 to vary the relationship of member 94 with respect to the film to provide proper framing of the film during the intermittent movement. Of course, motor 58 cannot be moved so far counterclockwise that radial extension 88 of shutter wheel 86 will not be able to block the light path from light source 84.

Drive arm 70 is preferably pivotable about the axis of aperture 72 through which a pivot pin connects the arm to a fixed point. If desired, however, the axis of aperture 72 may be colinear with the axis of aperture 106 to provide adjustability of arm 70 cooperatively with the framing adjustability provided by pivotal movement of motor 58 about the axis of aperture 106.

The operation of the shutter and intermittent film advancing mechanism is shown most clearly in FIGS. 5 through 8. As stated above, the motor is driven at a speed that is responsive to the sequencing signals on band 16. The sequencing signals are received by pickup head 56, and are then amplified and fed to synchronous generator 92, which controls the speed of motor 58.

When motor shaft 62 is in the position shown in FIG. 5, radial extension 88 blocks the light path between lamp 84 and mirror 38, and drive arm 70 is in a position to cause member 94 to apply a lateral force against film 10, thereby pushing the film sidewise between rollers 34 and 36, and advancing a length of the film to the right with respect to aperture plate 40 by overcoming the frictional resistance of pressure pads 48 and 50 against the film. When member 94 is no longer in contact with the film, as illustrated in FIG. 6, the film goes slack between rollers 34 and 36, and thus no further movement of the film will occur at aperture plate 40. At this time, radial extension 88 of shutter member 60 is out of the light path and the picture frame is being projected.

As capstan 30 continues to rotate and the forward portions of film 10 are thus pulled along, the slack between rollers 34 and 36 is taken up until rotation of shaft 62 carries shutter member 60 and diverting member 80 through their successive positions shown in FIGS. 6 through 8. As is seen from these figures, so long as there is slack in film 10 between rollers 34 and 36, the portion of film 10 adjacent aperture plate 40 remains motionless. Movement of the film at the aperture plate is restrained during the taking up of the slack (as shown in FIGS. 6 and 7) by pressure plate 44 which includes pressure pads 48 and 50 pressing the film against the aperture plate.

As seen most clearly in FIG. 8, as radial extension 88 operates to block the light path, member 94 again engages film 10 to advance the film to the right with respect to aperture plate 40 until it reaches the position shown in FIG. 5. Thereupon, the operation will be repeated again, with the slack in film 10 being gradually taken up by the capstan drive, while the film remains motionless with respect to the aperture plate, and radial extension 88 of shutter member 60 is outside the light path.

Any other conventional means may be used for stopping light from radiating along the light path through aperture 42 of aperture plate 40 during the periods of time that a length of the film is being intermittently pulled past the aperture plate. For example, any suitable means for blocking the light source through a shutter action, or for synchronously turning the light off and on through a stroboscopic action, may be used as desired.

Take-up reel 24, upon which film 10 is wound after it has moved through tthe film advancing path defined by rollers 26, 34, 36 and 28, is actuated in any conventional manner. It may be driven, for example, at a variable angular speed that produces a constant circumferential speed for the film as it is wound upon the rotating reel.

A conventional withdrawal mechanism (not shown) is used to withdraw pressure member 44, synchronous motor 58 with its shaft 62 and all elements carried by the shaft, pickup head 56, and pressure roller 54, so that film 10 can be rewound without frictional engagement by these elements. When the withdrawal mechanism is actuated, take-up reel 24 is idle and feed reel 22 will be driven in the conventional manner (in the clockwise direction in FIG. 2) to rewind film 10.

When the film advancing system of this invention is used in a motion picture camera with film having successive areas (sometimes referred to herein as "frames") for exposure to a light image focussed on the film, the aperture plate is on the side of the film adjacent the outside of the camera instead of on the side facing the inside of the projector, as in the illustrative embodiment of a motion picture projector described above. With a camera, of course, the film is opaque and thus no aperture need be provided adjacent the other side of the advancing film.

A novel film advancing system has been shown and described, in which a motion picture film without apertures (or "sprocket holes") may be advanced intermittently with respect to an aperture plate while the portions of the film adjacent the take-up reel move at a constant rate of speed. The illustrated embodiment utilizes a cartridge which can be simply plugged into a projector. The operation of the apparatus is very quiet and highly efficient. The present invention makes possible the production of a relatively inexpensive unit. Further, as already pointed out above, a relatively thin tape can be used because of the lack of apertures in the film. This results in lower film cost, a more compact cartridge, and a longer film on each reel.

The above detailed description has been given for clearness of understanding only. No unnecessary limitations should be understood therefrom, as modifications will be obvious to those skilled in the art.

What is claimed is:

1. A system for advancing a non-apertured continuous film that carries successive areas for pictures, together with sequencing signals coordinated with said successive areas, from a rotatable feed reel on which the film is wound for use, to a rotatable take-up reel on which it is wound after use, which comprises: means for holding said rotatable feed reel; means for holding said rotatable take-up reel; means for rotating said take-up reel; means defining a film advancing path having an entry end adjacent said feel reel and an exit end adjacent said take-up reel; an aperture plate located adjacent said film advancing path near the entry end thereof, said aperture plate defining an aperture that is substantially the size of each picture area on said film; drive means for advancing forward portions of said film at a constant speed toward the exit end of said film advancing path; means for restricting movement of succeeding portions of said film along said film advancing path with respect to said aperture plate; diverting means for periodically applying a lateral force against a portion of the advancing film intermediate said aperture plate and said drive means to divert said intermediate portion of the film sidewise from said film advancing path while the portions of the film forward of said diverting means continue to move toward the exit end of the film advancing path at a constant speed, thereby causing a succeeding length of said film to be intermittently pulled past said aperture plate and said movement restricting means and permitting said intermediate portion of the film to go slack upon release of said lateral diverting force; signal pickup means for receiving said sequencing signals from the forward portions of said film as they move along said film advancing path at a constant speed near the exit end of said path; means defining a light path through the aperture of said aperture plate to said film; means, cooperatively actuated with said diverting means, for stopping light from radiating along said path and impinging against said film whenever a lateral force is being applied against the film by said diverting means; and means coupling said pickup means to said diverting means whereby said lateral force will be provided in response to said sequencing signals.

2. The film advancing system of claim 1 in which said light stopping means is a shutter for blocking light from radiating along said light path whenever a lateral force is being applied against the film by said diverting means.

3. The film advancing system of claim 1 in which said sequencing signals are magnetic pulses and said pickup means comprises an electromagnetic head having a magnetic core surrounded by a coil, said head being positioned for contact with said film.

4. The film advancing system of claim 3 which includes means coupled to said head for amplifying the pulses induced in said coil and means for generating a signal responsive to said amplified pulses to operate said diverting means in response to said sequencing signals.

5. The film advancing system of claim 1 in which said diverting means comprises a reciprocating member with the frequency of its reciprocation being responsive to and determined by said sequencing signals.

6. The film advancing system of claim 2 which includes a motor having a shaft to which said shutter means is connected, and to which cam means is also connected to provide reciproating motion of said diverting means during movement of said shutter means into and out of position to block light radiating along said light path.

7. The film advancing system of claim 6 in which said cam means providing reciprocating motion comprises an eccentric pin connected to said shutter means with the axis of said pin being offset from the axis of said motor shaft, a drive arm having a fixed pivot point in one part thereof and a slot in another part thereof, with said slot receiving said eccentric pin, and means connecting said diverting means to said drive arm.

8. The film advancing system of claim 6 in which said shutter means comprises a wheel carrying a radial extension on a portion of its periphery, said extension being of a size to block said light path during a portion of the rotation of said shutter means, the other portion of the periphery of said wheel being of a size to leave said light path open during another portion of the rotation of said shutter means.

9. The film advancing system of claim 7 in which said shutter means comprises a wheel carrying a radial extension on a portion of its periphery, said extension being of a size to block said light path during a portion of the rotation of said shutter means, the other portion of the periphery of said wheel being of a size to leave said light path open during another portion of the rotation of said shutter means.

10. The film advancing system of claim 1 in which said movement restricting means comprises a pressure pad located adjacent said aperture plate.

11. The film advancing system of claim 1 in which said film advancing drive means comprises a capstan rotating at a constant angular speed positioned on one side of said film advancing path and a rotating pressure roller on the other side, said two members pressing against the film from opposite sides thereof to pull the film along said film advancing path at a constant linear speed.

12. The film advancing system of claim 1 in which said take-up reel rotating means, movement restricting means, film diverting means, and pickup means are mounted in a case having a cartridge-receiving space therein, and said feed reel, take-up reel, aperture plate, and means defining said film advancing path are mounted in a removable cartridge positioned in said cartridge-receiving space in said case, the walls of said cartridge having apertures spaced along said film advancing path adjacent said movement restricting means, film diverting means and pickup means to permit the latter to come into engagement with the advancing film.

13. The film advancing system of claim 12 in which said light stopping means and means coupling said pickup means and said film diverting means are also mounted in said case.

14. The film advancing system of claim 13 for use with a projector, which includes a light source and a mirror mounted adjacent said light source and disposed at an angle to reflect light along said light path to pass first through the aperture of said aperture plate and then through said film.

15. The film advancing system of claim 14 in which said mirror is mounted within said cartridge.

16. The film advancing system of claim 13 in which said film advancing drive means includes a capstan mounted within said cartridge and a freely rotating pressure roller and motor means for rotating said capstan mounted in said case, said capstan and pressure member being positioned to press against opposite sides of the film and pull the same along said film advancing path at a constant linear speed.

17. The film advancing system of claim 18 in which said diverting means further includes an arm having one end pivoted about an axis spaced from said shutter means and a slot adjacent the opposite end thereof, said slot receiving said pin; and means on said arm for engaging said film.

18. A film advancing system for use with non-apertured film that carries successive picture areas which comprises: means defining a film advancing path having an entry end adjacent a feed reel and an exit end adjacent a take-up reel; an aperture plate located adjacent said film advancing path between said entry and exit ends, said aperture plate defining an aperture that is substantially the size of each picture area; drive means for continuously advancing the exit end portion of said film; holding means for selectively restricting movement of said film adjacent said aperture; a motor having a shaft with shutter means connected to said shaft; and diverting means between said drive means and said holding means for exerting a lateral force against said film to create a loop therein and pull successive picture areas of said film intermittently into alignment with said aperture while said exit end portion is continuously advanced, said diverting means including an eccentric pin connected to said shutter means at a location spaced from the axis of rotation of said shaft.

19. A film advancing system as defined in claim 18, in which said film has sequencing signals coordinated with said successive areas, further including signal pickup means between said diverting means and said drive means for receiving said sequencing signals; and means between said signal pickup means and said motor for driving said motor at a speed that is proportional to the frequency of the sequencing signals.

20. A film advancing system as defined in claim 18, including a removable cartridge; a rotatable feed reel and a rotatable take-up reel mounted in the cartridge, and in which said film advancing path is located between said reels in said cartridge and said aperture plate is mounted in said cartridge, the walls of said cartridge containing an aperture aligned with said aperture plate to transmit light therethrough.

21. The combination as defined in claim 20, including a casing having a cartridge-receiving space therein with said holding means, motor and diverting means mounted in said casing, said holding means being aligned with said aperture in the walls of said cartridge and in which the walls of said cartridge contain a further aperture to permit said diverting means to come into engagement with the advancing film.

22. The combination as defined in claim 21, in which said drive means includes a rotatable capstan mounted within said cartridge and a freely rotatable pressure roller mounted in said casing, said capstan being positioned to press against one side of the advancing film, the walls of said cartridge containing an aperture adjacent said capstan to receive said freely rotating pressure roller to press from outside the cartridge against the other side of the advancing film, said capstan being rotatable by motor means to pull the film along the film advancing path at a constant linear speed.

23. The combination as defined in claim 20, for use in a projection, in which a mirror is mounted within said cartridge at an angle to reflect light from an outside source and direct said light along a light path passing first through the aperture of said aperture plate and then through said film.

References Cited
UNITED STATES PATENTS

| | | | |
|---|---|---|---|
| 2,225,832 | 12/1940 | Holbrook | 352—185 |
| 2,349,941 | 5/1944 | Cramwinkel et al. | 352—185 UX |

DONALD O. WOODIEL, Primary Examiner

U.S. Cl. X.R.

352—78

PO-1050
(5/69)

UNITED STATES PATENT OFFICE
CERTIFICATE OF CORRECTION

Patent No. 3,671,114           Dated June 20, 1972

Inventor(s)    Michael D. Thomas & Sidney Milovac

It is certified that error appears in the above-identified patent and that said Letters Patent are hereby corrected as shown below:

Column 2, line 49, delete line "beginning sidewise from . . ."

Column 3, line 47, "show sa" should be -- shows a--.

Column 3, line 53, "by Mylar" should be --of Mylar--.

Signed and sealed this 27th day of February 1973

(SEAL)
Attest:

EDWARD M. FLETCHER, JR.
Attesting Officer

ROBERT GOTTSCHALK
Commissioner of Patents